USOO5239545A

United States Patent [19]

Buchholz

[11] Patent Number: 5,239,545
[45] Date of Patent: Aug. 24, 1993

[54] CHANNEL ACCESS CONTROL IN A COMMUNICATION SYSTEM

[75] Inventor: Dale R. Buchholz, Palatine, Ill.

[73] Assignee: Motorola, Inc., Schaumburg, Ill.

[21] Appl. No.: 608,952

[22] Filed: Nov. 5, 1990

[51] Int. Cl.$^5$ ............................................. H04J 3/16
[52] U.S. Cl. .................................. 370/95.3; 370/95.1
[58] Field of Search ............ 370/94.1, 95.1, 95.3, 370/85.6, 85.7, 85.1, 110.1, 94.2, 104.1; 455/34, 53, 58, 34.1, 34.2, 53.1, 58.1, 58.2; 340/825.5, 825.51

[56] References Cited

U.S. PATENT DOCUMENTS

| Re. 32,789 | 3/1977 | Lynk, Jr. et al. | |
|---|---|---|---|
| 4,517,669 | 5/1985 | Freeburg et al. | |
| 4,581,736 | 4/1986 | Dobyns et al. | |
| 4,665,519 | 5/1987 | Kirchner et al. | 370/95.3 |
| 4,688,212 | 8/1987 | MacGinitie et al. | |
| 4,819,229 | 4/1989 | Pritty et al. | |
| 4,831,373 | 5/1989 | Hess. | |
| 4,870,408 | 9/1989 | Zdunek et al. | 455/34 |
| 5,008,883 | 4/1991 | Eizenhöfer et al. | 370/95.1 |
| 5,012,469 | 3/1991 | Sardana | 370/95.3 |

FOREIGN PATENT DOCUMENTS 0299538 7/1988 European Pat. Off. .

OTHER PUBLICATIONS

The Bell System Technical Journal, "Advanced Mobile Phone Service", Jan. 1979, vol. 58, No. 1, Part 3, pp. 43-69, describes control architecture in an analog mobile phone service system.

Primary Examiner—Douglas W. Olms
Assistant Examiner—Wellington Chin
Attorney, Agent, or Firm—Richard A. Sonnentag; Raymond A. Jenski; Raymond J. Warren

[57] ABSTRACT

A CM (105) receives requests for data transfer from a series of UMs (101-103) and from an EM (104). The requests contain the UM (101-103) or EM (104) address and the size of the data packet to be transferred. The CM (105) processes the requests on a FIFO basis, stores the requests in a queue and assigns either a small data channel or a large data channel, depending on the packet size to be transferred, and also the corresponding number of required timeslots. The CM (105) picks the first request off the queue and sends a grant to the particular UM (101-103) or EM (104) which receive the grant and immediately access either the assigned small or large data channels in the required number of timeslots.

20 Claims, 5 Drawing Sheets

CHANNEL ACCESS CONTROL IN A COMMUNICATION SYSTEM

FIELD OF THE INVENTION

The invention generally relates to information systems in which data is transmitted by packets, and more specifically, to structuring of packets in TDM frames for data transmission. Reference is made to U.S. patent application Ser. No. 07/608,867, "Scheduling in a Communication System" in behalf Buchholz et al., filed on the same date herewith, containing related subject matter and assigned to the assignee of the present invention.

BACKGROUND OF THE INVENTION

Generally, data transmission systems convey information in the form of packets from an originator to a specified addressee. Typical systems, such as token ring and polling systems, query the specified addressee to determine if the addressee has information to be transmitted. These types of systems, however, are not without their limitations. The token ring data transmission system, for example, passes a token or message to all users around a ring to determine if the users have data to be transmitted. Each user on the ring receives the message, decodes it, and transmits data if necessary. Polling systems are similar in that a periodic poll is sent to all users to determine if data transmission is required. The users again decode the poll and transmit data if necessary. Both of these data transmission systems limit system throughput by introducing unnecessary data on the bus or lines carrying the data. The systems also tie up the users when transmission may not be necessary.

Data can also be transferred in time-division multiplexed (TDM) systems, such as satellite communication systems. Satellite systems generally use a satellite acting as a relay, receiving and transmitting requests from land-based ground stations. When the ground stations require data transmission, they request access to a TDM timeslot. Depending on the prioritizing mechanism, the requests are processed and the TDM timeslot issued. The system, however, is limited in the fact that the satellite system acts on a distributed queue management basis, assigning all necessary timeslots to the requesting ground stations at the start of a TDM frame. This requires that all ground stations receive the request information and monitor when other ground stations transmit, and when their particular transmit time arrives, access the system. If one of the requesting ground stations does not receive any of the requests sent by other ground stations, it has the possibility of becoming out of synchronization with the rest of the system. If this happens, the ground station must first re-synchronize to the system and repeat the requesting process. The process of re-synchronization and repeating the requesting process can be very time consuming and result in perceptible user delay.

Thus, a need exists for a data transmission system which transmits data only when the user needs to transmit data and also does not require the user to monitor all other users to access the system.

SUMMARY OF THE INVENTION

A control module controls access to a plurality of data channels in a radio frequency (RF) time-division multiple access (TDMA) communication system. The control module is coupled to a plurality of user modules over the RF link, wherein at least first and second user modules have sent a first and second access request command to the control module to request access to at least one data channel. The control module provides repetitive TDMA timeslots including at least a first TDMA timeslot and at least one data channel disposed in at least the first TDMA timeslot. The control module generates an access grant command and receives at least the first and second access request command in at least the first TDMA timeslot. The control module determines which of at least the first access request command and second access request command was received first and, responsive to the receiving, assigns access to at least one data channel. The control module sends the access grant command in at least the first TDMA timeslot to one of the first user module and second user module in response to the assigning.

DETAILED DESCRIPTION OF A PREFERRED EMBODIMENT

Figure 1:
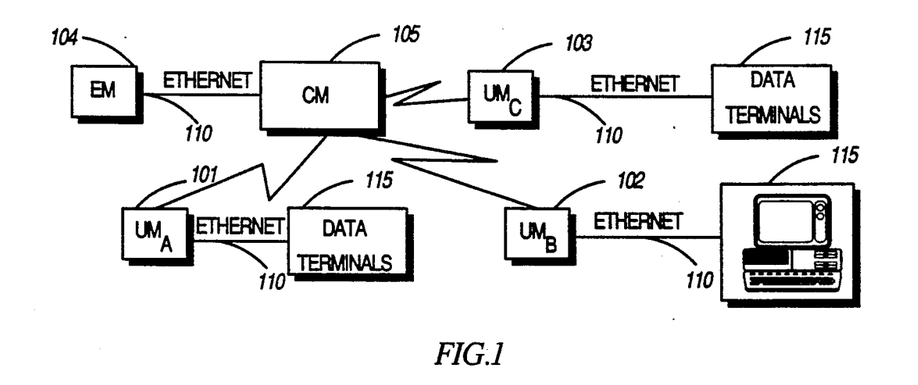
FIG. 1 generally depicts a data communication system which may incorporate the present invention.

FIG. 1 generally depicts a RF data communication system. Generally, a user module (UM) or modules 101-103 transmit a request to a control module (CM) 105 over an RF link. The request that is transmitted includes the source UM address, the destination and the data packet size that is required for the particular transmission. The CM 105 receives the requests from the UMs 101-103 on a first in/first out (FIFO) basis. The CM 105 processes the requests from the UMs 101-103 and accesses the timeslots necessary to transmit the particular packet size. A grant is then sent from the CM 105 to the source UM whose request was received first. The source UM receives the grant and in the next TDM frame, accesses the required timeslots.

FIG. 1 also depicts the UMs 101-103 and the CM 105 connected to an Ethernet local area network (LAN) system 110. The CM 105, through the Ethernet LAN system 110, may typically be connected an external module (EM) 104 which may include other CMs, LANs, metropolitan area networks (MANs) and wide area networks (WANs) including public switched telephone networks (PSTNs) (not shown). The UMs, through the Ethernet LAN system 110, are typically connected to data terminals 115, which are personal computers in the preferred embodiment. The data terminals 115 serve as origination points for data to be sent by the UMs 101-103 to the CM 105. The UMs 101-103 generate transmission requests when there is data to be sent. The Ethernet LAN system 110 serves as an interface between the data terminals 115 and the UMs 101-103.

Figure 2:
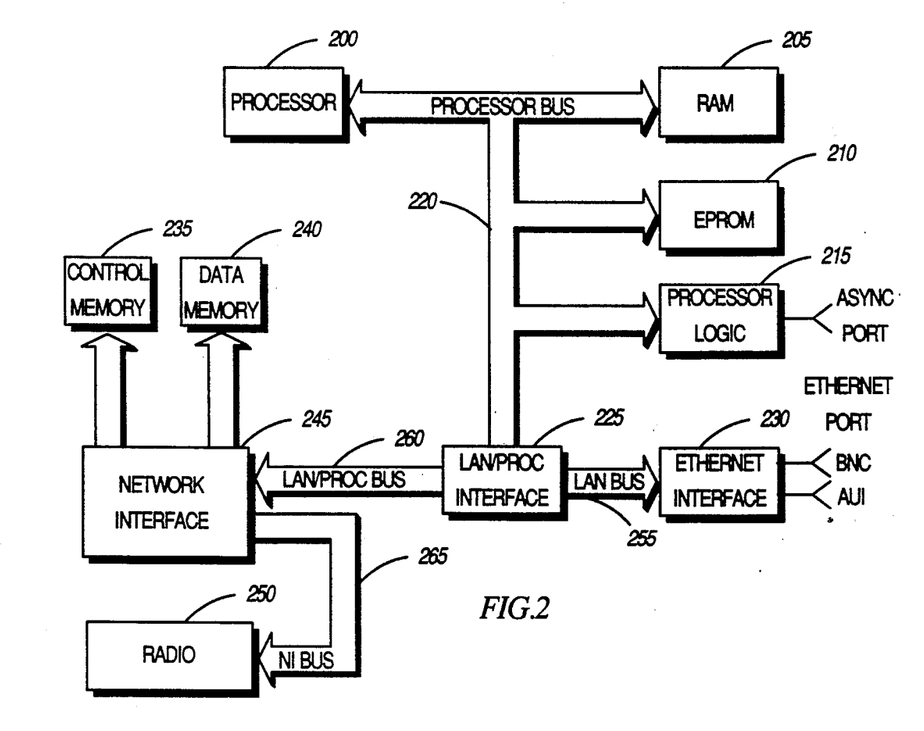
FIG. 2 generally illustrates the user module and control module in the above mentioned data communication system.

FIG. 2 is a block diagram of the UMs 101-103 and the CM 105. A processor 200, which is a Motorola 68000 in the preferred embodiment, is connected to a RAM 205, an EPROM 210 and additional processor logic 215 through a processor bus 220. The EPROM, which is a Seeq Inc FLASH TM NQ48F512K-300 in the preferred embodiment, is a non-volatile storage media that is used to store system software. The software is copied to the RAM 205 at start-up to provide faster execution time. The EPROM 210 is reprogrammable via the asynchronous port on the UMs 101-103. An Ethernet interface 230, which is made up of an AMD Inc LANCE TM chip set and a National Inc coaxial transceiver in the preferred embodiment, provides interface to the Ethernet LAN system 110. A LAN bus 255 transmits data from the Ethernet interface 230 to a LAN/processor interface 225. The LAN/processor interface 225 is coupled to a network interface 245 which has control memory 235 and data memory 240. The network interface 245 is a fast packet switch which provides information transfer among the processor 200, Ethernet interface 230 and a radio 250 via time-division, fast packet switching technology. The information is transferred among these devices via the data memory 240. The control memory 235 is used to control the operation of the network interface 245 and hence the location of data stored in the data memory 240.

Figure 3:
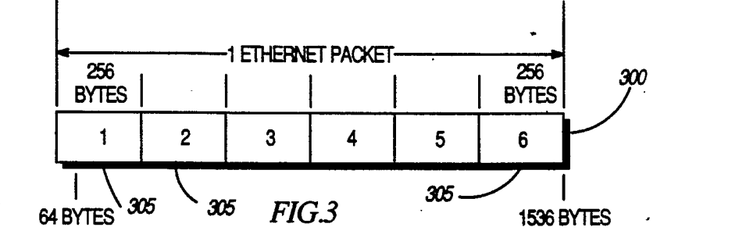
FIG. 3 depicts an Ethernet LAN system packet subdivided into 256-byte fragments in accordance with the invention.

FIG. 3 depicts an Ethernet packet 300. Ethernet packets 300 may vary in size between 64 and 1536 bytes in length and the error characteristic in the Ethernet LAN system 110 is $10^{-8}$. The RF data communication system depicted in FIG. 1 has an expected error characteristic of $10^{-5}$, requiring the use of RF packets (fragments) in the 256-byte range. Ethernet packets 300 larger than this size need to be fragmented in order to meet the RF data communication system capability. FIG. 3 depicts a standard Ethernet packet 300 subdivided into six separate 256-byte fragments 305.

Typical traffic on the Ethernet LAN system 110 can generally be classified by packet size. For example, a small packet might be less than 128-bytes and is sufficient to accommodate higher layer protocol acknowledgements/negative acknowledgements, heart beat timers, terminal servers, etc.. Medium packets are typically sized from 512 to 600 bytes and best suited for file transfers and data base transactions. Large packets typically range from 1024 to 1100 bytes and are also used for file transfers and data base transactions. Assuming 256-byte fragments are used over the RF link to transfer Ethernet packets 300, a small packet will easily fit into one fragment; most medium packets will require three fragments and most large packets will require five fragments. The maximum Ethernet packet 300 size of 1536-bytes requires six fragments.

Figure 4:
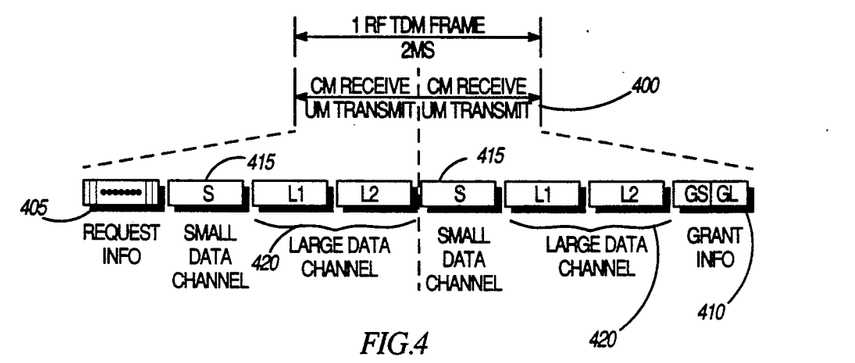
FIG. 4 generally depicts half-duplex TDM frame structure in accordance with the invention.

FIG. 4 generally depicts 256-byte fragment accessing in accordance with the invention. The system uses time-division multiplexing (TDM) on a RF carrier to exchange information from the CM 105 to the corresponding UMs 101-103. One RF TDM frame 400; which has a duration of two milliseconds in the preferred embodiment, is divided to accommodate the half-duplex system. During the first half of the RF TDM frame 400, the CM 105 receives data transmitted by the UMs 101-103. In the second half of the RF TDM frame 400, the roles are reversed and the UMs 101-103 receive data transmitted by the CM 105. The first half of the RF TDM frame 400 comprises a 660 byte request timeslot 405 comprised of 12 55-byte slots and three 256-byte fragments 415,420. In the preferred embodiment, each UM 101-103 can transmit up to three requests per RF TDM frame 400 and the CM 105 can receive up to twelve requests per RF TDM frame 400. One of the 256-byte fragments comprises a small data channel 415 while the other two 256-byte fragments 305 comprise one large data channel 420. The second half of the RF TDM frame 400 also consists of three 256-byte fragments 415,420 (again, one 256-byte fragment 305 comprising a small data channel 415 and two 256-byte fragments comprising a large data channel 420) but the request timeslot 405 is replaced with a grant timeslot 410. The grant timeslot actually contains two separate grants; one for the small data channel and one for the large data channel. In the first half of the RF TDM frame 400, the request timeslot 405 is first in time followed by the small data channel 415 and then the large data channel 420. In the second half of the RF TDM frame, the small data channel 415 is first in time followed by the large data channel 420 and finally the grant timeslot 410.

Figure 5:
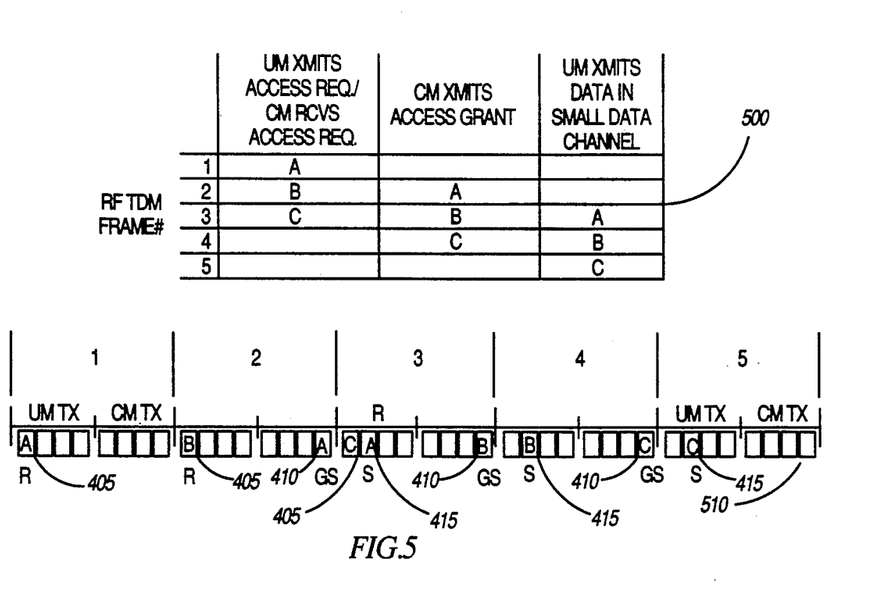
FIG. 5 depicts a small data channel access matrix and the subsequent timing information in accordance with the invention.

Accessing of the fragments in the required data channel is best explained by example. FIG. 5 depicts a small data channel access matrix 500 and the corresponding timing diagram 510 in accordance with the invention. To initiate a data transfer, the UMs 101-103 transmit a request to the CM 105. A request contains information such as the address of the source UM and the number of fragments (depending on Ethernet packet 300 size) required for transmission. The fact that the UMs 101-103 notify the CM 105 in advance as to the number of fragments required for transmission allows the CM 105 to grant either a small data channel or a large data channel to the requesting UMs 101-103. Again, FIG. 5 only depicts UMs 101-103 that require a data transfer of less than 256-bytes (only one fragment 305), thus only a small data channel 415 is required. Significant to the example is that the UMs 101-103 may all request access to the small data channel 415 during the same RF TDM frame 400, but the CM 105 only processes the requests on a FIFO basis. Continuing, if the CM 105 receives a first request in the request timeslot 405 from $UM_A$ 101 in RF TDM frame #1, the CM 105 sends a small data channel grant back to $UM_A$ 101 in the grant timeslot 410 in RF TDM frame #2. $UM_A$ 101, upon receiving the grant, will access the small data channel 415 in RF TDM frame #3. $UM_B$ 102 also requests access to the small data channel 415 and for this example, the request is sent in request timeslot 405 of RF TDM frame #2. A small data channel grant is sent back from the CM 105 to $UM_B$ 102 in the grant timeslot 410 of RF TDM frame #3. Again, $UM_B$ 102 accesses the small data channel 415 in the ensuing RF TDM frame time, #4, upon receiving the grant in RF TDM frame #3. Finally, $UM_C$ 103 sends a request in the request timeslot 405 of RF TDM frame #3, receives a small data channel grant in the grant timeslot 410 of RF TDM frame #4 and accesses the small data channel 415 in RF TDM frame #5.

Figure 6:
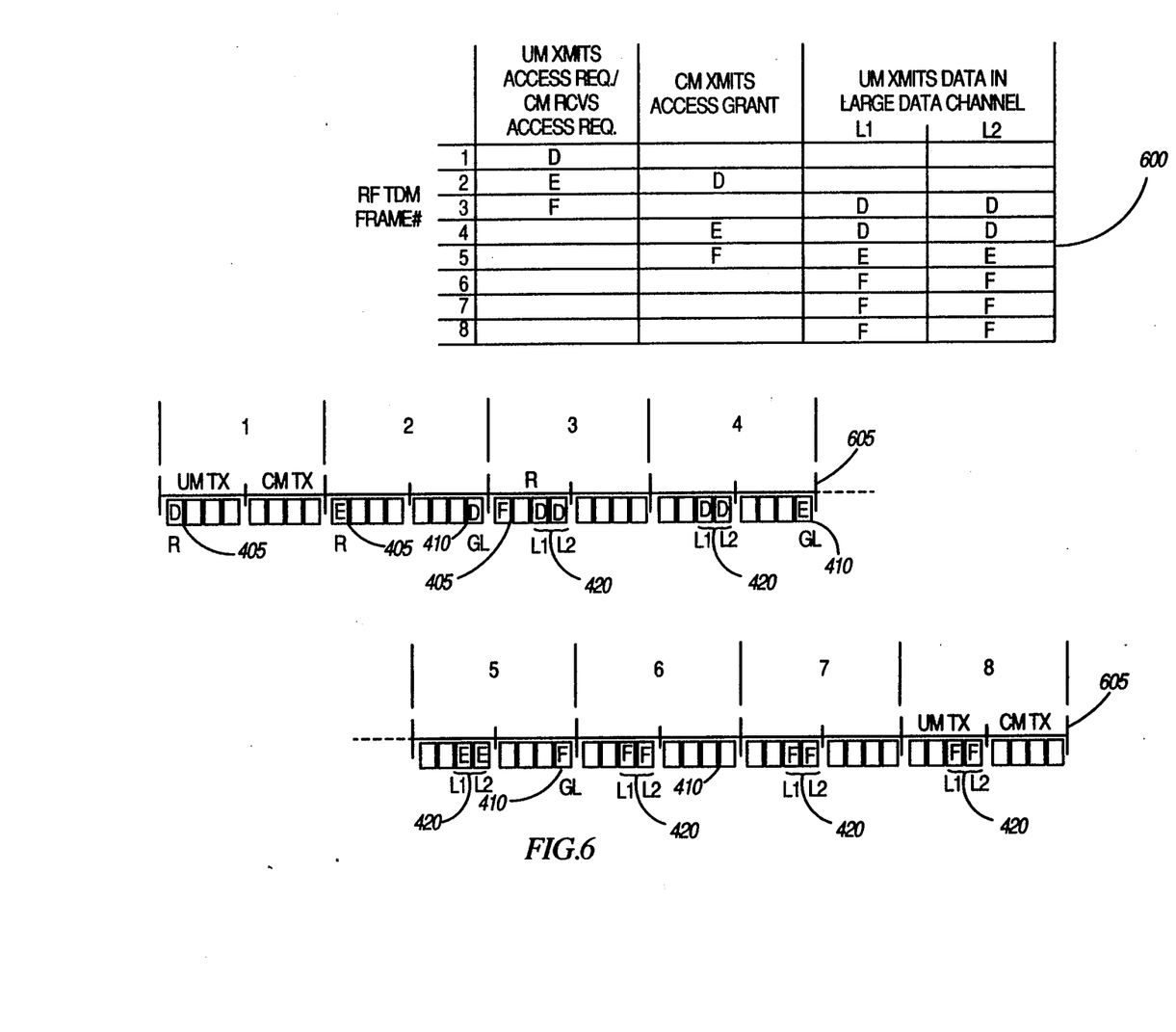
FIG. 6 depicts a large data channel access matrix and the subsequent timing information in accordance with the invention.

For UMs requiring greater than 256-bytes (greater than one fragment) for data transmission, the large data channel 420 is accessed. FIG. 6 depicts a large data channel access matrix 600 and the corresponding timing information 605 in accordance with the invention. Again, accessing of the large data channel is best explained by an example. $UM_D$, $UM_E$, and $UM_F$ (not shown) are coupled to the CM 105 via the RF link. In accessing of the large data channel 420, each UM, in its request to the CM 105, requests two fragments, four fragments or six fragments depending on the size of the Ethernet packet 300. In this example, $UM_D$ requires four of the fragments 305, $UM_E$ requires two of the fragments 305 and $UM_F$ requires six of the fragments 305. This corresponds to $UM_D$ requiring greater than 512 bytes but less than 1024 bytes, $UM_E$ requiring greater than 256-bytes but less than 512 bytes and $UM_F$ requiring greater than 1024 bytes. Remembering that the CM 105 processes requests from the UMs on a FIFO basis thus, in this example, it can be assumed that the request from $UM_D$ is received first, the request from $UM_E$ received second and finally, the request from $UM_F$ received third. Returning to FIG. 6, $UM_D$ initiates a transfer of its four fragments by sending an access request in the request timeslot 405 of TDM frame #1. The CM 105 assigns the four fragments into large data channels 420 in two consecutive RF TDM frames 400 and, since $UM_D$s request is received first, immediately sends a large data channel grant in the grant timeslot 410 of RF TDM frame #2. When $UM_D$ receives the grant, it immediately transmits two fragments 305 in the large data channel 420 of RF TDM frame #3 and the remaining two fragments 305 in the large data channel 420 of RF TDM frame #4. Referring to the large data channel access matrix 600, it is seen that $UM_E$ sent an access request in the request timeslot 405 of RF TDM frame #2. Since the CM 105 had previously assigned the four fragments for $UM_D$, the CM 105 knows that the next available large data channel 420 occurs in RF TDM frame #5 and will thus skip RF TDM frame #3 and send a large data channel grant in the grant timeslot 410 of RF TDM frame #4. When $UM_E$ receives the grant, it immediately transmits its two fragment 305 in the large data channel 420 of RF TDM frame #5. Again referring to the large data channel access matrix 600, it is seen that $UM_F$ sent an access request in the request timeslot 405 of RF TDM frame #3 to the CM 105. The CM 105, having assigned the request for $UM_E$, knows that the next available large data channel 420 will be in RF TDM frame #6 and will thus send a large data channel grant in the grant timeslot 410 of RF TDM frame #5. $UM_F$, upon receiving the grant, will transmit two fragments 305 in the large data channel 420 of RF TDM frame #6, another two fragments 305 in the large data channel of RF TDM frame #7 and its final two fragments 305 in the large data channel 420 of RF TDM frame #8. If still another UM were to require access to the large data channel 420, it would not receive a grant until RF TDM frame #8 since the next available large data channel 420 occurs in RF TDM frame #9.

Figure 7:
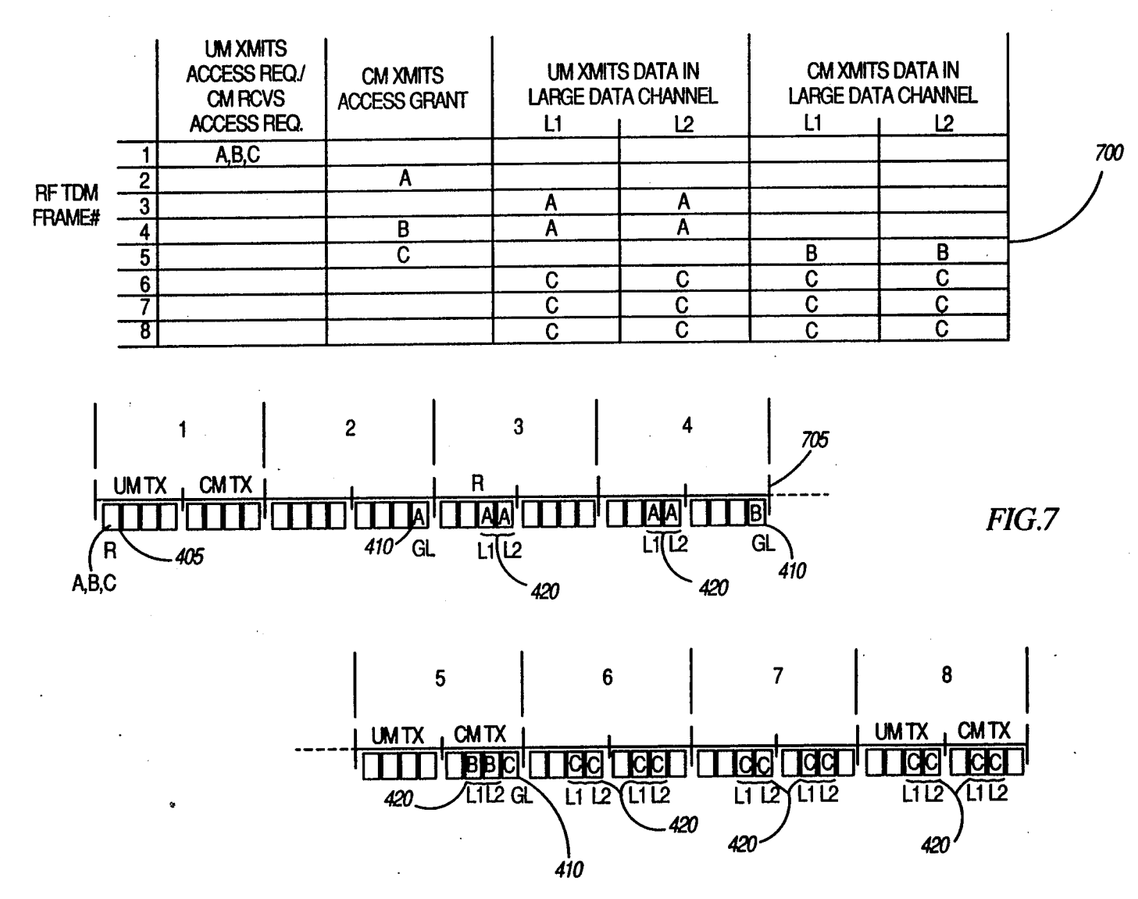
FIG. 7 depicts a system access matrix and the subsequent timing information in accordance with the invention.

The RF data communication system of FIG. 1 can also transfer data originating from the CM 105 and relay data from one UM 101-103 to another. FIG. 7 depicts a system access matrix 700 and the subsequent timing information 705 of these types of system access. For example, referring to FIG. 1, assume $UM_A$ 101 requires access to the large data channel 420 and uses four fragments, the CM 105 needs to transfer two fragments to $UM_B$ 102, and $UM_C$ 103 needs to transfer six fragments to $UM_A$ 101. The system allows all access requests to be received in the request timeslot 405 of RF TDM frame #1, and as can be seen, the access request for $UM_A$ 101 was received first, the request for $UM_B$ 102 second and the request for $UM_C$ 103 third. $UM_A$ receives an access grant in the grant timeslot 410 of RF TDM frame #2 and immediately accesses the system in the large data channel 420 of RF TDM frames #3 and #4. During RF TDM frame #4, a grant is issued to the CM 105 to transfer its two fragments to $UM_B$ 102 in the grant timeslot 410. In this case, the CM 105 accesses the large data channel 420 in RF TDM frame #5 in the CM TX half of the RF TDM frame 400. During RF TDM frame #5, a grant is also being sent during the grant timeslot 410 to $UM_C$ 103. When the grant is received, $UM_C$ 103 immediately accesses the large data channel 420 during the UM TX half of RF TDM frame #6, transferring two of its six fragments to the CM 105. The CM 105 relays the two fragments to $UM_A$ 101 in the large data channel 420 during the CM TX half of RF TDM frame #6. This process is repeated in RF TDM frame #7 and #8 until all six fragments are transferred from $UM_C$ 103 to $UM_A$ 101.

Figure 8:
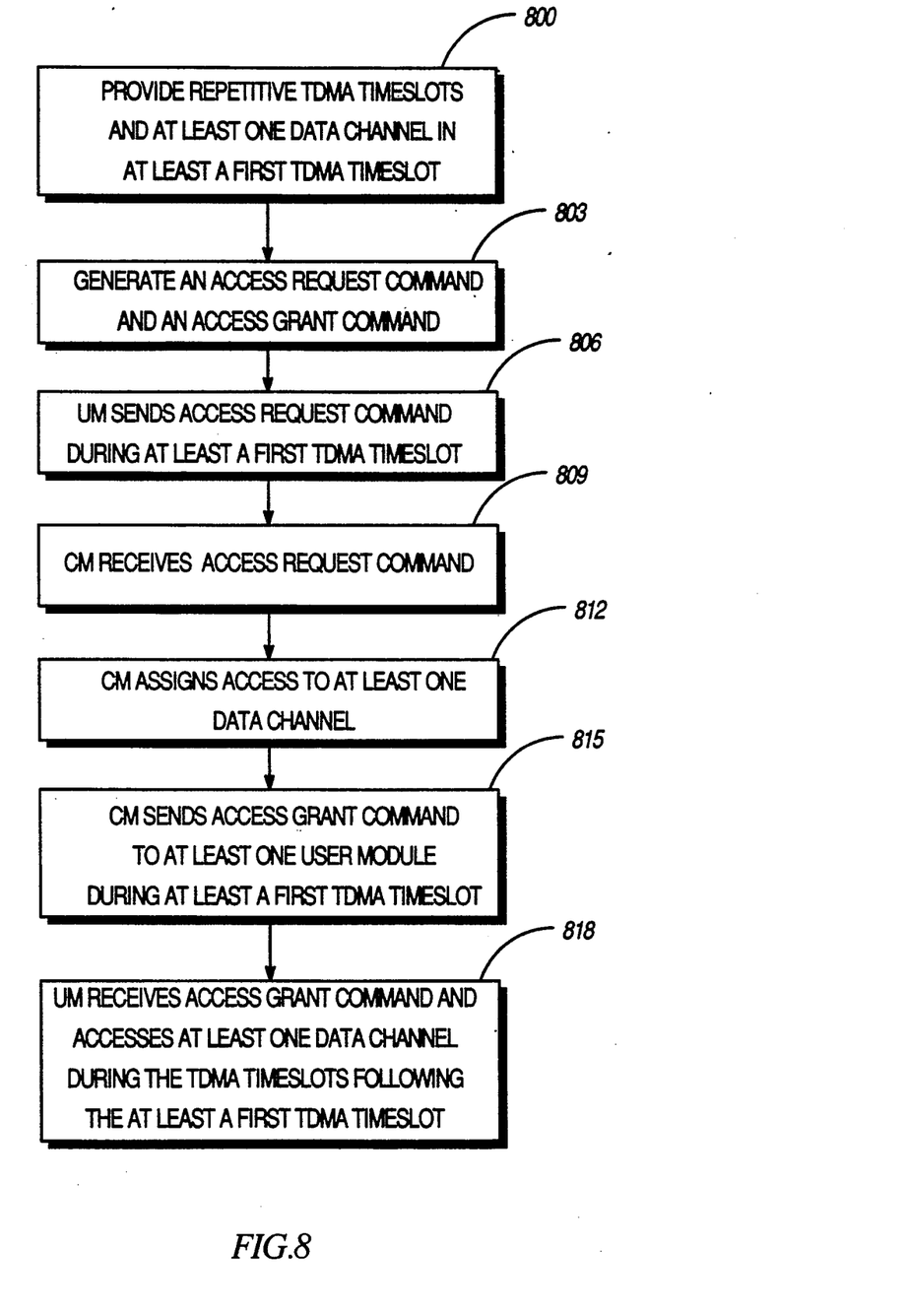
FIG. 8 is a flow diagram illustrating the steps of assigning channel access in accordance with the invention.

FIG. 8 illustrates in flow diagram form, the steps the RF data communication system of FIG. 1 performs to assign channel access in accordance with the invention. The system provides at 800 repetitive TDMA timeslots and at least one data channel in at least a first TDMA timeslot. The system then generates at 803 an access request command and an access grant command in which the UMs 101-103 send at 806 the access request command during at least the first TDMA timeslot. The DM 105 receives at 809 the access request command and assigns at 812, to the UM whose access request command was received first, access to at least one data channel. The CM 105 sends at 815 the access grant command the particular UM during at least the first TDMA timeslot, which then receives at 818 the access grant command and accesses the data channel during the TDMA timeslots following at least the first TDMA timeslot.

Significant to the system is the fact, although the examples illustrate accessing of the small data channel and large data channel separately, the CM 105 can receive up to twelve requests per RF TDM frame 400 and the grant timeslot 410 is subdivided into a small data channel grant and a large data channel grant. This means that, depending on the size of the Ethernet packet 300, accessing of the small data channel 415 and the large data channel 420 can occur independently but can still use a common RF TDM frame 400. Accessing of the data channels in this manner is efficient since the UMs 101-103 requiring transmission of only one fragment 305 only use a small portion of the RF TDM frame 400 while UMs requiring more than one fragment 305 use a larger portion of the RF TDM frame 400. In addition, the UMs 101-103 only access the small data channel 415 or the large data channel 420 when they have data to be transmitted thus decreasing system data traffic and increasing system throughput.

Processing of commands, specifically access request commands, is time-limited by the choice of processor 200. Consequently, FIGS. 5, 6, and 7 depict receiving an access request command in one TDM frame, taking a significant amount of time for processing of the commands, then sending a corresponding access grant command in a subsequent TDM frame. However, as processor speed increases, processor 200 may eventually be replaced by a processor which can receive an access request command, process the command, and send a corresponding access grant command all in a single (first) TDM frame. In this scenario, the timing diagrams depicted in FIGS. 5, 6, and 7 would vary slightly, but the general method of scheduling, and the remaining hardware depicted in FIGS. 1 and 2, would stay the same.

What is claimed is:

1. A control module to control access to a plurality of data channels in a radio frequency (RF) time-division multiple access (TDMA) communication system coupled to a plurality of user modules over a RF link, at least first and second user modules having sent a first and second access request commands to the control module to request access to at least one data channel, the control module comprising:

means for providing repetitive TDM frames, including at least a first TDM frame;

means for providing a data channel disposed in each of said TDM frames;

means for generating an access grant command;

means for receiving at least said first and second access request command in at least said first TDM frame;

means, coupled to said means for receiving, for determining which of at least said first access request commands and second access request command said receiving means received first;

means, responsive to said means for determining, for assigning access to said said data channel; and means for sending said access grant command in at least said first TDM frame to one of said first user module and second user module in response to said means for assigning.

2. The control module of claim 1 wherein the control module further comprises means for linking to a plurality of external modules.

3. The control module of claim 2 wherein said means for linking further comprises means for linking through a local area network (LAN) of the Ethernet type.

4. The control module of claim 2 wherein at least one of said plurality of external modules further comprises means for sending an access request command to request access to said at least one data channel.

5. A radio frequency (RF) time-division multiple access (TDMA) communication system employing a plurality of user modules and a control module to control access to a plurality of data channels, the RF TDMA communication system comprising:

means for providing repetitive TDM frames including at least a first TDM frame;

means for providing at least one data channel disposed in at least said first TDM frame;

means for generating an access request command;

means for generating an access grant command;

means, at one user module, for sending said access request command during at least said first TDM frame;

means, at the control module, for receiving said access request command from said one user module;

means, coupled to said means for receiving, for assigning access to said at least one data channel in response to receipt of said access request command;

means, responsive to said means for assigning, for sending said access grant command to said one user module during at least said first TDM frame; and means, at said one user module, for receiving said access grant command and for accessing said at least one data channel during said TDM frames following at least said first TDM frame.

6. The RF TDMA communication system of claim 5 wherein said means for generating an access request command further comprises means for determining how many of said TDM frames following at least said first TDM frame said means for accessing accesses.

7. The RF TDMA communication system of claim 5 wherein said means for receiving further comprises means for queueing at least one of said access requests on a first in/first out (FIFO) basis.

8. The RF TDMA communication system of claim 7 wherein said means for assigning further comprises means for processing the first access request queued by said means for queueing.

9. The RF TDMA communication system of claim 8 wherein said means for processing further comprises means for granting access to at least one of the data channels to the user module whose access request said means for queueing queues first.

10. The RF TDMA communication system of claim 5 wherein at least said first TDM frame further comprises a plurality of data channels.

11. The RF TDMA communication system of claim 10 wherein at least one data channel further comprises 256-bytes.

12. A method of controlling access to a plurality of data channels in a control module incorporated in a radio frequency (RF) time-division multiple access (TDMA) communication system, the control module coupled to a plurality of user modules over the RF link, at least first and second user modules having sent a first and second access request commands to the control module to request access to at least one data channel, the method comprising:

providing repetitive TDM frames including at least a first TDM frame;

providing at least one data channel disposed in at least said first TDM frame;

generating an access grant command;

receiving at least said first and second access request command in at least said first TDM frame;

determining which of at least said first access request command and second access request commands said step of receiving received first;

assigning access, responsive to said step of determining, to said at least one data channel; and sending said access grant command in at least said first TDM frame to one of said first user module and second user module in response to said assigning.

13. The method of claim 12 further comprising the step of linking the control module to a plurality of external modules.

14. The method of claim 13 wherein said step of linking further comprises the step of linking through a local area network (LAN) of the Ethernet type.

15. The method of claim 13 further comprising the step of sending an access request command from at least one of said plurality of external modules to the control module to request access to said at least one data channel.

16. A method of controlling access to a plurality of data channels in a radio frequency (RF) time-division multiple access (TDMA) communication system employing a plurality of user modules and a control module, the method comprising the steps of:

providing repetitive TDM frames including at least a first TDM frame;

providing at least one data channel disposed in at least said first TDM frame;

generating an access request command;

generating an access grant command;

sending, at one user module, said access request command during at least said first TDM frame;

receiving, at the control module, said access request command from said one user module;

assigning access to said at least one data channel in response to receipt of said access request command;

sending, responsive to said step of assigning, said access grant command to said one user module during at least said first TDM frame; and receiving, at said one user module, said access grant command and accessing said at least one data channel during said TDM frames following at least said first TDM frame.

17. The method of claim 16 wherein said step of generating an access request command further comprises the step of determining how many of said TDM frames following at least said first TDM frames said means for accessing accesses.

18. The method of claim 16 wherein said step of receiving further comprises the step of queueing at least one of said access requests on a first in/first out (FIFO) basis.

19. The method of claim 18 wherein said step of assigning further comprises means for processing the first access request queued by said means for queueing.

20. The method of claim 19 wherein said step of processing further comprises the step of granting access to at least one of the data channels to the user module whose access request said means for queueing queues first.

* * * * *